No. 702,712. Patented June 17, 1902.
J. ELSTONE.
APPARATUS FOR ATTACHING OR DETACHING HANDLES OF BRUSHES, BROOMS, OR THE LIKE.
(Application filed Apr. 1, 1902.)
(No Model.)
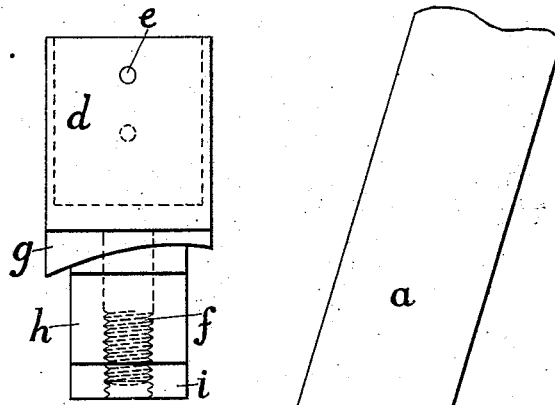
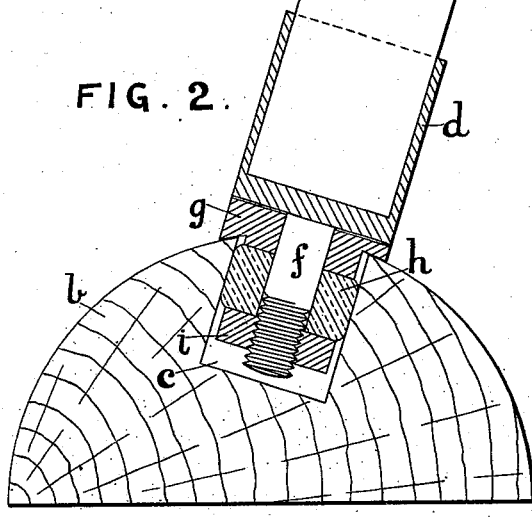
Witnesses:
Allan Bennett.
John E. Walsh
Inventor:
Joseph Elstone.

UNITED STATES PATENT OFFICE.

JOSEPH ELSTONE, OF HEMSWORTH, ENGLAND.

APPARATUS FOR ATTACHING OR DETACHING HANDLES OF BRUSHES, BROOMS, OR THE LIKE.

SPECIFICATION forming part of Letters Patent No. 702,712, dated June 17, 1902.

Application filed April 1, 1902. Serial No. 100,960. (No model.)

*To all whom it may concern:*

Be it known that I, JOSEPH ELSTONE, a subject of the King of Great Britain and Ireland, residing at Hemsworth, near Wakefield, in the county of York, England, have invented a new and useful Apparatus for Attaching or Detaching the Handles of Brushes, Brooms, or the Like, of which the following is a specification.

This invention relates to an improved apparatus or appliance for attaching and detaching the handles of brushes and brooms, but applicable also to other similar articles in which a handle or shaft is required to be detachably secured within a socket.

My invention is illustrated in the accompanying drawings, in which—

Figure 1 is a front elevation of the appliance detached; and Fig. 2, a front elevation, in section, showing same in position.

$a$ is the handle or shaft, and $b$ the brush-head, having socket $c$.

My improved appliance consists of a metal cylinder or socket $d$, in which the handle or shaft $a$ is fixed by means of screws or nails $e$. The cylinder or socket $d$ has a spindle $f$, which is screwed at its outer end. On this spindle are fitted, as shown in Fig. 1, a metal cap-washer $g$, a broad rubber or other elastic washer $h$, and a metal nut $i$.

To affix the appliance, the spindle, with washers and nut in position, is pressed into the socket $c$ of the brush-head until the metal cap-washer $g$ bears on the curved surface of the brush-head $b$, which thus prevents the said washer $g$ from turning or rotating with the handle $a$. The handle $a$ is then turned or rotated and the spindle $f$ screws into the nut $i$ and raises it, the said nut $i$ being prevented from turning or rotating with the spindle by the friction or grip of the rubber washer $h$, which binds it to the fixed cap-washer $g$. The nut $i$ therefore compresses the rubber washer $h$ and causes it to expand outward, as shown in Fig. 2, so as to press tightly against the sides of the socket $c$ in the brush-head. The handle $a$ is thus firmly attached to the head $b$ of the brush or broom.

To detach the handle or shaft $a$ from the head $b$, the handle is turned or rotated in the opposite direction. This action relaxes the compression of the rubber washer $h$ by the nut $i$ and enables the appliance to be readily withdrawn from the socket $c$ of the brush-head.

What I claim as my invention, and desire to secure by Letters Patent, is—

The combination, with the handle or shaft $a$ and the head $b$ having socket $c$, of the metal cylinder or socket $d$, spindle $f$, metal cap-washer $g$, expanding washer $h$, and metal nut $i$, substantially as described, for the purpose specified.

In testimony whereof I have signed my name to this specification in the presence of two subscribing witnesses.

JOSEPH ELSTONE.

Witnesses:
 ALLAN BENNETT,
 JOHN E. WALSH.